US009505977B2

United States Patent
Riddle et al.

(10) Patent No.: US 9,505,977 B2
(45) Date of Patent: Nov. 29, 2016

(54) GADOLINIUM-LOADED GEL SCINTILLATORS FOR NEUTRON AND ANTINEUTRINO DETECTION

(71) Applicants: Catherine Lynn Riddle, Idaho Falls, ID (US); Douglas William Akers, Idaho Falls, ID (US); Ricky Lynn Demmer, Idaho Falls, ID (US); Patricia Denise Paviet, Rockville, MD (US); Mark William Drigert, Idaho Falls, ID (US)

(72) Inventors: Catherine Lynn Riddle, Idaho Falls, ID (US); Douglas William Akers, Idaho Falls, ID (US); Ricky Lynn Demmer, Idaho Falls, ID (US); Patricia Denise Paviet, Rockville, MD (US); Mark William Drigert, Idaho Falls, ID (US)

(73) Assignee: The United States of America Department of Energy, Washington, DC (US)

( * ) Notice: Subject to any disclaimer, the term of this patent is extended or adjusted under 35 U.S.C. 154(b) by 232 days.

(21) Appl. No.: 14/446,531

(22) Filed: Jul. 30, 2014

(65) Prior Publication Data

US 2016/0194558 A1 Jul. 7, 2016

(51) Int. Cl.
*G01J 3/02* (2006.01)
*C09K 11/06* (2006.01)
*C09K 11/88* (2006.01)
*C09K 11/56* (2006.01)
*G01T 3/06* (2006.01)
*G01T 1/16* (2006.01)
*G01T 1/202* (2006.01)

(52) U.S. Cl.
CPC ............. *C09K 11/06* (2013.01); *C09K 11/562* (2013.01); *C09K 11/883* (2013.01); *G01T 1/16* (2013.01); *G01T 1/202* (2013.01); *G01T 3/06* (2013.01); *C09K 2211/182* (2013.01)

(58) Field of Classification Search
CPC ........................................................ G01J 3/02
See application file for complete search history.

(56) References Cited

U.S. PATENT DOCUMENTS

| | | | | |
|---|---|---|---|---|
| 4,588,698 | A * | 5/1986 | Gruner et al. | 436/535 |
| 6,114,038 | A * | 9/2000 | Castro et al. | 428/402.24 |
| 2005/0250171 | A1* | 11/2005 | Greenwalt | 435/23 |
| 2006/0202125 | A1* | 9/2006 | Suhami | 250/368 |
| 2006/0293581 | A1* | 12/2006 | Plewes et al. | 600/407 |
| 2011/0024639 | A1* | 2/2011 | Dazeley et al. | 250/366 |
| 2013/0270443 | A1* | 10/2013 | Dijkstra et al. | 250/366 |
| 2014/0224993 | A1* | 8/2014 | Noh et al. | 250/362 |
| 2014/0306117 | A1* | 10/2014 | Vacheret et al. | 250/366 |

* cited by examiner

*Primary Examiner* — David Porta
*Assistant Examiner* — Hugh H Maupin
(74) *Attorney, Agent, or Firm* — Karen Blouin; Michael J. Dobbs; Brian J. Lally (57) ABSTRACT

A gadolinium (Gd) loaded scintillation gel (Gd-ScintGel) compound allows for neutron and gamma-ray detection. The unique gel scintillator encompasses some of the best features of both liquid and solid scintillators, yet without many of the disadvantages associated therewith. Preferably, the gel scintillator is a water soluble Gd-DTPA compound and water soluble fluorophores such as: CdSe/ZnS (or ZnS) quantum dot (Q-dot) nanoparticles, coumarin derivatives 7-hydroxy-4-methylcoumarin, 7-hydroxy-4-methylcoumarin-3-acetic acid, 7-hydroxycoumarin-3-carboxylic acid, and Alexa Fluor 350 as well as a carbostyril compound, carbostyril 124 in a stable water-based gel, such as methylcellulose or polyacrylamide polymers. The Gd-loaded ScintGel allows for a homogenious distribution of the Gd-DTPA and the fluorophores, and yields clean fluorescent emission peaks. A moderator, such as deuterium or a water-based clear polymer, can be incorporated in the Gd-ScintGel. The gel scintillators can be used in compact detectors, including neutron and antineutrino detectors.

18 Claims, 4 Drawing Sheets

GADOLINIUM-LOADED GEL SCINTILLATORS FOR NEUTRON AND ANTINEUTRINO DETECTION

GOVERNMENT INTERESTS

The United States Government has rights in this invention pursuant to Contract No. DE-AC07-05ID14517, between the U.S. Department of Energy (DOE) and the Battelle Energy Alliance LLC.

BACKGROUND OF THE INVENTION

Radiation detection is used in many applications, including scientific applications, medical applications, and security applications. A wide range of such applications may benefit from improvements in materials used in radiation detectors.

SUMMARY OF THE INVENTION

An exemplary embodiment of the invention is directed to a gel-scintillator that allows for neutron and gamma-ray detection.

Another exemplary embodiment is directed to a gel-scintillator that encompasses some of the best features of both liquid and solid scintillators, yet without many of the disadvantages associated therewith.

Another exemplary embodiment is directed to a gel-scintillator that allows for production of radiation detectors that are viable alternatives to detectors based on Helium-3 ($^3$He).

Another exemplary embodiment is directed to a gadolinium (Gd) loaded scintillation gel (Gd-ScintGel) compound that allows for neutron and gamma-ray detection.

Another exemplary embodiment is directed to Gd-ScintGel compounds that are usable in compact neutron detectors and antineutrino detectors.

Another exemplary embodiment is directed to a gel-scintillator that comprises a water soluble Gd-DTPA compound and soluble fluorophor (FLP) homogeneously distributed in the water based gel. Preferably, the FLP is CdSe/ZnS (or ZnS) quantum dot (Q-dot) nanoparticles, coumarin derivatives such as 7-hydroxy-4-methylcoumarin, 7-hydroxy-4-methylcoumarin-3-acetic acid, 7-hydroxycoumarin-3-carboxylic acid, and Alexa Fluor 350 as well as a carbostyril compound, carbostyril 124, or a combination thereof.

DETAILED DESCRIPTION OF EXEMPLARY EMBODIMENTS

It will be readily understood that the features of exemplary embodiments may be arranged and designed in a wide variety of different configurations. Thus, the following detailed description of the exemplary embodiments of apparatus and methods is not intended to limit the scope of the invention as claimed, but is merely representative of selected exemplary embodiments that implement the principles described herein.

The features, structures, and/or characteristics described herein may be combined in any suitable manner in one or more embodiments or arrangements. That is, a particular feature, structure, or characteristic described in connection with one embodiment may also be included in at least one other embodiment or arrangement.

Helium-3 ($^3$He) is a light, non-radioactive isotope of helium. It is an important isotope in instrumentation for radiation detection, such as neutron detection and antineutrino detection. $^3$He detectors are primed to target gamma rays and neutron emissions, which are present in most radiological material. $^3$He detectors allow for wide spread protection against the importing (transport) of nuclear material and nuclear weapons. However, there is currently a shortage of $^3$He. Thus, there is a need for a suitable alternative radiation detector that can viably replace the capabilities of the $^3$He detector.

As discussed in more detail later, exemplary embodiments provide for efficient, stable replacement detectors for $^3$He detectors. The exemplary detectors include improved materials that provide an alternative to $^3$He. The exemplary detector materials also allow for scanning capabilities that achieve an 'all cargo' scan system instead of just random checks.

Exemplary embodiments allow for novel scintillator detectors. The exemplary scintillator materials allow for compact radiation detectors that are a suitable replacement for $^3$He detectors.

The exemplary scintillator uses a stable gel material with an efficient neutron capture agent. In the exemplary embodiment this agent includes gadolinium (Gd) containing coordination compounds. As a result, the exemplary scintillation compounds allow for more efficient, stable, and safer operation of radiation detectors. Various gadolinium isotopes may be used, such as $^{155}$Gd or $^{157}$Gd.

Both liquid and solid versions of scintillators have respective disadvantages. For example, liquid scintillators have the disadvantage that they cannot be preassembled on site. Also, the neutron capture agents used may comprise unstable compounds, which have to be constantly monitored and purified. Additionally, current compact detectors (e.g., those with 1 m$^3$ active volume) have issues with liquid scintillation materials with regard to size, quantum efficiency, stability, and spatial resolution for the detection area. Solid scintillators have the disadvantages of fewer protons (antineutrino targets) per cubic cm, reduction of detector efficiency due to 'dead areas' in the solid material, and less neutrons generated for capture. Flammability and large size can also be issues.

The exemplary embodiment mitigates these problems by providing novel gel scintillation compounds. The novel scintillator incorporates some of the best properties of both liquid and solid type scintillators, yet without many of the disadvantages associated therewith. The exemplary scintillation compounds are both liquid and solid in nature. That is, the scintillator retains a semi solid gel. As can be appreciated, the novel gel scintillator exploits positive aspects of liquid scintillators while avoiding stability problems of solid polymers. By using the permeable gel composition, the liquid/solid disadvantages are further mitigated.

Exemplary scintillation compounds allow for the production of neutron detectors, including detectors that are able to spot neutron emissions from vehicles and shipping containers. Thus, these neutron sensitive materials enable the detection of neutron-emitting fissionable materials, such as plutonium.

Special nuclear material (SNM) such as plutonium-239 ($^{239}$Pu), uranium-233 ($^{233}$U), or uranium-235 ($^{235}$U) can be used in the creation of nuclear explosives due to its fissile nature of being able to self-sustain a chain reaction with neutrons. Spontaneous and induced fission in SNM results in the emission of neutrons and gamma-rays. Since the ambient background of neutrons is fairly low, any measured neutron levels above the background value may be an indicator that SNM is present. Also, these particles have unique fission signatures (e.g., release of gamma-rays and neutrons) that depend on their specific interaction with detection material. The multiplicities of and time correlations between these particles can be used as indicators of the presence of fissile material. Detectors sensitive to these signatures are consequently useful for nuclear material monitoring, search, and characterization. As a result, these characteristic factors allow SNM to be identified via neutron detection.

The emission of antineutrinos can also be related to nuclear material content. For example, antineutrinos can be detected via the inverse beta decay process:

When an electron antineutrino ($\bar{v}_e$) collides with a proton (p) such as hydrogen, it produces a positron (e$^+$) and a neutron (n). Within a few nanoseconds the positron creates a (first) flash of scintillation light. About 30 microseconds after the positron flash, the neutron that traveled through the scintillator can be captured by a nucleus of gadolinium. The neutron-gadolinium interaction produces a very distinctive gamma ray cascade which causes a total of approximately 8 MeV of energy to be released. The gamma rays immediately induce a second flash of light. Photomultiplier tubes can be used to detect these two light pulses, each only a few nanoseconds wide and separated by a few tens of microseconds. Thus, the interactions of the two produced particles (positron and neutron) create an antineutrino signature, which includes two relatively intense flashes of light that occur so close in time to one another that they appear to be almost simultaneous. This two-step flash signature makes it easy to differentiate an antineutrino interaction.

Again, neutron capture on Gd produces a shower of γ-rays with a total energy of approximately 8 MeV. This level of total energy is significantly higher than the 2.2 MeV γ-ray energy that results from neutron capture on protons (e.g., hydrogen). The energy level can be a further factor in particle discrimination.

Figure 1:
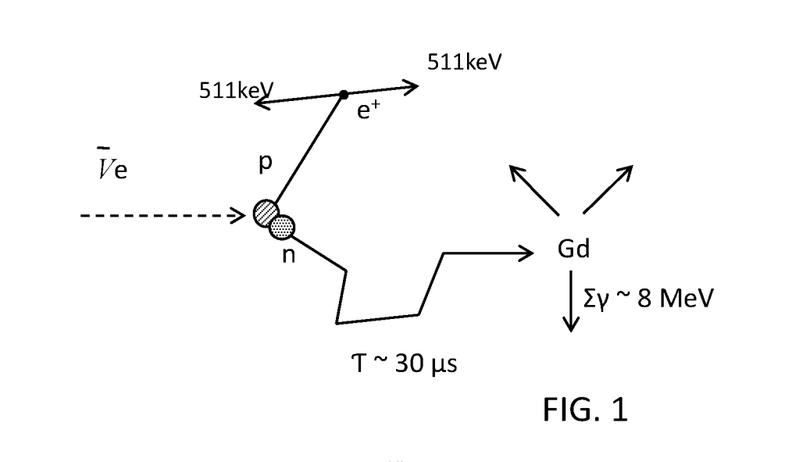
FIG. 1 illustrates a prompt signal and neutron capture on gadolinium.

FIG. 1 shows a prompt signal and neutron capture on Gd. The positron is immediate, resulting in 1-8 MeV (including 511KeV gamma). The neutron is delayed (e.g., t=28-30 us). A ~8 MeV gamma shower (1 MeV×8) is produced.

The exemplary scintillation compounds allow for the production of exemplary antineutrino detectors. Antineutrinos (like neutrons) are linked to nuclear reactions such as nuclear fission. For example, isotopes uranium-238 ($^{238}$U) and uranium-235 ($^{235}$U) absorb neutrons and undergo fission, producing antineutrinos with each emission (or decay). Some $^{238}$U isotopes capture neutrons and decay into isotopes of plutonium-239 ($^{239}$Pu), which also fission and emit antineutrinos.

Many applications of interest in antineutrino detection are in the area of nuclear nonproliferation. Over the course of a nuclear reactor's fuel cycle, the antineutrino count rate drops as uranium content decreases and plutonium content increases. Thus, the emitted antineutrino rate from a nuclear reactor depends on the thermal power and fissile isotopic content of the reactor. That is, antineutrino count rate is proportional to the fission rate of the isotopes, and thus it is approximately proportional to the reactor's power. The antineutrino rate can therefore be used to continuously measure a nuclear reactor's operational status (off/on) and power, and in real time.

If the reactor power and initial fuel loading are known, and the antineutrino event rates are sufficiently high (roughly, hundreds or thousands of events per day or week), then the antineutrino rate can be used to estimate the evolving amounts of fissile uranium and plutonium that are currently present in the reactor core. For a given fuel type the degree of neutron irradiation primarily determines these changing amounts of fissile material. These changing amounts may be referred to as the fuel "burnup". At (spent) fuel discharge the fuel burnup directly correlates with the amount of plutonium present in the spent fuel, and thus is an important parameter in the context of reactor material safeguards. Thus, antineutrino detectors can provide an important verification role in the overall determination of whether the expected types and amounts of nuclear material are actually present.

Detector arrangements for reactor monitoring and safeguards are typically indirect means that do not involve the direct measurement of the fissile isotopic content of the reactor but instead rely primarily on semi-annual or annual inspections of coded tags and seals placed on fuel assemblies, and other measures such as video surveillance of spent fuel cooling ponds. When direct measurements do take place, they are often implemented when the reactor is offline, such as before or after fuel is introduced into the reactor. These measurements may include the counting of fuel bundles or the checking of the enrichment of random samples of fresh or spent fuel rods. Under certain security assessments, reactor operators are additionally required to submit periodic declarations of their fissile holdings, including the amount of plutonium generated in each fuel cycle. This submitted information can then be cross-checked for consistency against operational records and initial fuel inventories. Exemplary embodiments allow for antineutrino detectors that can be used in this security assessment to provide accurate verification. Thus, as discussed in more detail later, these exemplary antineutrino detectors offer a means for accurately verifying the power history and fissile inventory of a nuclear reactor.

In an exemplary embodiment the gel scintillator includes a gadolinium compound and a fluorescent compound in a stable polymer gel. The gel can be molded to fit compact detector designs. The gel is configured to hold its shape. The Gd is dispersed homogeneously throughout the gel along with the fluorescent component.

Figure 2:
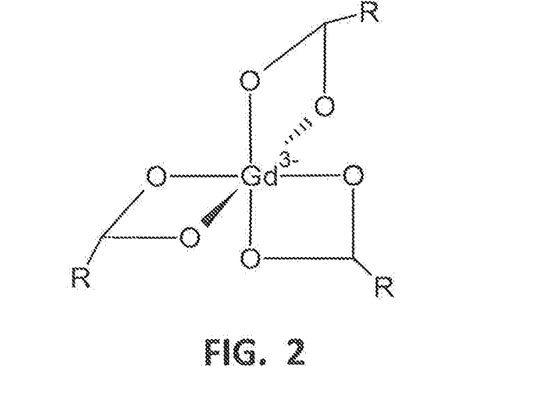
FIG. 2 illustrates a gadolinium beta-diketone.

In an exemplary embodiment the scintillator gel (which may also be referenced herein as scint-gel or ScintGel) includes a water soluble Gd compound (e.g., beta-diketone or DPTA) and the fluorescent component. FIG. 2 shows gadolinium beta-diketone (where R is an alkyl group). The fluorescent component comprises water soluble FLP such as tunable Quantum dots ("Q-dots") nanoparticles or comparable FLP compounds. The Gd compounds and FLP are homogeneously dispersed in a stable, non-toxic, water absorbent gel. An example water absorbent gel can comprise a methylcellulose polymer. Alternative water-based gels can comprise agarose (especially in neutron detection) or polyacrylamide (especially in antineutrino detection).

The FLP is a fluorescent chemical compound that can re-emit light upon light excitation and is preferably homogeneously distributed in the water based gel. These FLP preferably incompass a range possible choices including: CdSe/ZnS (or ZnS) quantum dot (Q-dot) nanoparticles, coumarin derivatives such as 7-hydroxy-4-methylcoumarin, 7-hydroxy-4-methylcoumarin-3-acetic acid, 7-hydroxycoumarin-3-carboxylic acid, and Alexa Fluor 350 as well as a carbostyril compound, carbostyril 124, or a combination thereof. Quantum efficiency for the FLP preferably ranges from 90-99% at an absorption range of 363-386 nm with an emission range of 446-500 nm. The FLP preferably has a pH from 7 to 9, which is well within the range of the Gd loaded scintillation gel pH for the highest quantum efficiency.

An exemplary scint-gel has a low density of about 1.25 g/cm$^3$ and is transparent. The composition of the exemplary scint-gel can be targeted (modified) to assist detection efficiency of specific types of radiation detectors, including a neutron detector, an antineutrino detector, etc. For example, the scint-gel can incorporate a moderator. For neutron detection the (neutron) moderator may comprise deuterium (heavy water). For antineutrino detection the moderator may comprise a water-based clear polymer.

The novel scint-gel comprises a unique gel complex. However, it should be understood that the exemplary scint-gels employed can vary in compound density, concentration, and volume, especially to provide optimal detection based on the usage environment scenario. Again, the moldable scint-gel allows for usage in compact detectors. For example, the gel is usable in detectors comprising a 0.36-1.0 m$^3$ active volume.

Figure 3:
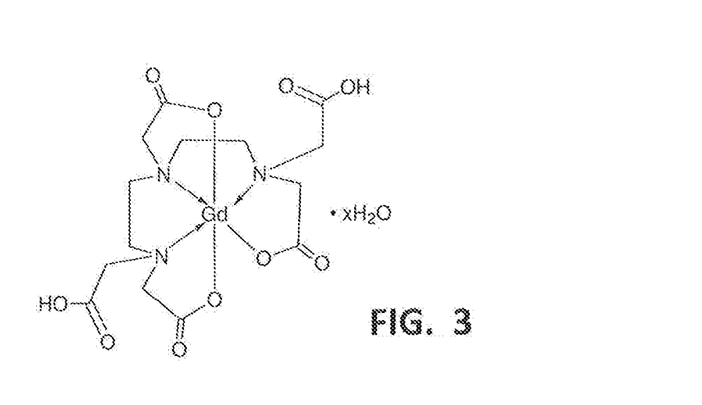
FIG. 3 illustrates the structure of gadolinium-diethylenetriamine-pentaacetic acid (Gd-DTPA) xH$_2$O.

Examples of gadolinium (Gd) compounds include Gd-diethylene triaminepentaacetic acid (Gd-DTPA) xH$_2$O; and Gd(NO$_3$)$_3$.6H$_2$O (Gd(III) nitrate); and Gd$_2$(SO$_4$)$_3$ (Gd(III) sulfate). FIG. 3 shows the structure of the gadolinium compound Gd-diethylene triaminepentaacetic acid (Gd-DTPA) xH$_2$O. The Gd compounds can be purchased from Sigma Aldrich Chemical Co. (Milwaukee, Wis.).

The tunable Q-dots have electronic properties intermediate between those of bulk semiconductors and those of discrete molecules. In general, Q-dots are fluorescent semiconductor nanoparticles whose electronic characteristics are closely related to the size and shape of a single crystal. They are chemically stable and easy to tune to specific wavelengths. The Q-dots are more efficient than current scintillators. They also have the potential for greater efficiencies than water-based detectors wherein the interactions in the water produce less light.

The Q-dot nanoparticles will fluoresce when tuned to specific wavelengths. Even though the chemical makeup of the quantum dots may be the same, and they are dissolved in an identical solvent, they can still fluoresce in noticeably different colors (i.e., blue ~481 nm; green ~520 nm; and orange ~612 nm). This is because the Q-dot bandgap (and thus the wavelength of emitted light) depends strongly on the particle size. The smaller the Q-dot then the shorter the emitted wavelength of light. The "blue" range dots have the smallest particle size, whereas the "green" range dots are slightly larger, and the "orange" range dots are the largest.

The Q-dot material, which is a nanoscale material, is used as the detection material. The surface area of the Q-dots is far larger than that of bulk material of the same volume. As a result, many more electrons are released from Q-dots via the photoelectric effect. The sensing mechanism of a nano-particle Q-dot is based on the absorption interactions between the electromagnetic energy and the nano-particle material. The absorption of irradiance or incident radiation intensity at distance t can be calculated by using the equation $I=I_0 \exp(\alpha t)$. In the equation, t is the distance that the radiation traveled into the material, $\alpha$ is the absorption coefficient (which is a constant), and $I_0$ is the original radiation intensity. The total absorption coefficient represents the sum of three mechanisms: (1) the photoelectric effect; (2) the Compton effect; and (3) pair production. However, for radiation energies lower than 100 KeV, the photoelectric effect dominates.

The lifetime of the Q-dots under a high energy irradiation is orders of magnitude longer than those of quantum well devices. The degradation of Q-dot devices is suppressed by 100 or 1000 times at the highest dose, as compared to that of quantum well based devices. Thus, Q-dots are irradiation stable.

Examples of usable Q-dot nanoparticles include CdSe/ZnS core-shell dots and ZnCdTe dots. The CdSe/ZnS Q-dots are water soluble in a medium such as a carboxylic acid medium or a chloroform medium. The fluorescent emission peak for the water soluble CdSe/ZnS Q-dots in the carboxylic acid medium are well within the detection limits of a photomultiplier tube (PMT). The water soluble CdSe/ZnS Q-dots are also very soluble in solution with the Gd-DTPA and in the gel, which provides stability and optical transparency. In an exemplary embodiment the CdSe/ZnS core-shell Q-dots in water soluble carboxylic acid (COOH) solution form a transparent gel, and the dots fluoresce in a blue-purple color at the 430 nm wavelength. Quantum dot nanoparticles can be purchased from Ocean NanoTech (Springdale, Ark.) and NN-Labs (Fayetteville, Ark.).

In an exemplary embodiment, water is the major component of the Gd-ScintGel. Thus, such a Gd-ScintGel detector can perform substantially the same as water-based detectors. However, an exemplary scint-gel detector has advantages over a water-based detector. For example, water-Cerenkov detectors are relatively difficult and expensive to deploy, and there are doubts about the practicality of keeping unfiltered water clean over an extended period. In contrast, a scint-gel detector can be built off site relatively inexpensively and can be easily deployed to different areas. Furthermore, the scint-gel detector, by virtue of its semi-solid design, is substantially resistant to common contaminants that typically collect and need to be filtered from water of water-based detectors.

Advantageous scint-gel detector features also include a higher Cerenkov light yields (relative to photons per MeV for water,), and thus give better energy resolution (or sensitivity). For example, in exemplary embodiments scint-gels detector yield thousands of photons per MeV for scintillator versus only tens of photons per MeV for water. The Q-dots provide short decay times (~10ns) and high quantum yields. Measurements have demonstrated that neutron/gamma-ray characteristics of an exemplary Q-dot ZnS scintillator are significantly better than those of current neutron scintillators such as Li2B4O7glass and 6Li-loaded plastic scintillators.

The addition of Gadolinium (Gd) to the detection medium reduces neutron capture time from about 200 ns to approximately 30 ns, while providing a much tighter time signature and commensurate reduction in uncorrelated background. The Gd also provides a neutron-to-gamma ray conversion that improves the scintillation efficiency of the Q-dots. The quantum efficiencies of additional FLP's (7-hydroxy-4-methylcoumarin, 7-hydroxy-4-methylcoumarin-3-acetic acid, 7-hydroxycoumarin-3-carboxylic acid, Alexa Fluor 350, and carbostyril 124) are comparable to the Q-dots at a range from 90-99% with an absorption range of 350-386 nm and an emission range of 446-500 nm. The highest quantum efficiency for these FLP compounds is achieved at a pH from 7 to 9 which is well within the range of the Gd loaded scintillation gel pH. The neutron-gamma ray discrimination ability for the exemplary scint-gel is best described as having sensitivity between a plastic and crystal scintillator. Plastic scintillators have roughly 20 percent greater sensitivity for neutron/gamma-ray discrimination than liquid scintillators, and crystals scintillators are considerably more sensitive than plastics.

The light yield from the novel gel scintillator, which is different for capture reaction products of a thermal neutron and a gamma-ray, determines the discrimination ability between a neutron and gamma-ray. The gamma-ray response time is much shorter than the neutron response time, which allows for neutron/gamma-ray discrimination by using a pulse-shape analysis. By using a gel composition, the liquid/solid disadvantages are mitigated. As discussed herein throughout, advantages of the exemplary gel scintillator detectors over other detectors are many.

An exemplary gel composition homogenously binds the Gd and FLP fluorescent compounds. The gel compounds have the ability to homogenously combine with the Gd beta-diketone or Gd-DTPA and the FLP. Scint-gel materials (such as polyacrylamide) are stable, nontoxic, transparent, and will readily absorb water soluble compounds. In some embodiments the scint-gel materials can make up 95% of the gel's mass. In an exemplary embodiment the gel composition is synthetic porous material originally derived from a gel, such as an aerogel, in which the liquid component has been replaced with gas.

Silica-based aerogel has a solid texture and rigidity similar to polystyrene, but it retains the properties of a gel and can accommodate multiple compounds homogeneously distributed within its microstructure. The exemplary embodiment allows for the aerogel to be manufactured to fit substantially any geometry of detector. Once the aerogel is molded it can retain its shape indefinitely, which allows the detector to be moved to any new detection area with ease.

The exemplary embodiment also allows for the aerogel to be manufactured off site. In contrast, liquid scintillators generally must be constructed on site, which requires that they be disassembled and reassembled at each new location of usage.

Again, the exemplary gel compound allows for the scintillating components to be homogeneously held throughout the scintillator. In contrast, solid scintillators typically hold the neutron capture agent in mylar sheets pressed between polyethylene layers. As previously noted, the non-homogeneous nature of solid scintillators also causes 'dead areas' where no (antineutrino) detection can occur, which significantly decreases detector efficiency. Thus, solid polymer scintillators can be replaced with the exemplary semi-solid Gd-loaded gel scintillators.

As previously noted, the exemplary Gd-loaded/FLP scint-gel can be employed in neutron detectors. Although specific neutron detector designs can vary based on the way in which the conversion material is arranged and how the neutron absorption reaction products are detected, detectors can typically be classified into one of three main categories: proportional, scintillator, and semiconductor detectors. Proportional detectors use a gas to amplify the charge from the original charged particles generated by a neutron absorption reaction in the conversion material. The amplified charge is proportional to the original charge. A $^3$He proportional detector uses $^3$He gas as both the conversion material and for the gas amplification. Other proportional detectors use a layer of solid material as a conversion material, with argon gas that provides the charge amplification. These detectors are sealed gas-filled tubes with electronic connections.

Scintillator detectors use solid or liquid scintillating materials, which are materials that emit light when struck by an incoming particle. The conversion material is incorporated in the scintillator. When the conversion material absorbs neutrons, the resulting charged particles deposit energy in the scintillating material. This causes the scintillator material to emit light that can be converted to an electric signal. The electric signal is measurable.

Semiconductor detectors consist of semiconductor chips with conversion material. The conversion material can be incorporated into the chip, applied in a layer on the chip, or applied to a three-dimensional structure on the chip. These three semiconductor detector types can be respectively referred to as bulk semiconductor, coated/layered semiconductor, and three-dimensional semiconductor detectors. The charged particles from a neutron absorption reaction in the conversion material deposit energy in the semiconductor, creating an electric signal.

As can be appreciated, the exemplary Gd/FLP/$H_2O$ loaded scint-gel incorporates the best parts of both scintillation detectors and semiconductor detectors into a self moderating gel, reducing both the size of the detector as well as increasing detector sensitivity from the large neutron capture cross section associated with Gd. Using Gd and FLP's in a hydroscopic gel absorbed with $H_2O$, will allow for a high neutron capture cross section in a reduced area, making it an excellent candidate for replacing $^3$He. Furthermore, as previously noted, the exemplary Gd-ScintGel also incorporates the best properties of both liquid and solid scintillators without the disadvantages associated therewith, such as continuous filtering to keep liquids free of contaminates; slow throughput of containers; higher base component costs; 'dead' voids in solid scintillators; and lower overall efficiencies than Gd.

An exemplary scintillator includes Gd-DTPA and CdSe/ZnS core-shell Q-dots, or a one of the comparable FLP, homogenously dispersed in a gel such as polyacrylamide. The Gd-DTPA loaded gels form a very strong, durable structure. The Gd-DTPA (gadolinium-diethylene triamine-pentaacetic acid) is completely soluble in water and remains soluble throughout the gelling process forming an optically transparent, rigid gel. The increased solubility provides an advantage over Gd beta-diketone. The Gd-DTPA also performs very well in its capacity to absorb neutrons. The water soluble FLP's will perform well with respect to synthesis of a gel and loading of the Gd-DTPA. The carboxylic acid in the DTPA aids in both neutron and antineutrino detection via the capture of hydrogen nuclei in the scintillator. The increased solubility of Gd-DTPA in water increases the amount of Gd in the gel and increases neutron capture and the neutrons produced from antineutrino reactions. At Gd concentrations above 0.1 wt% the fraction of neutron captures exceed 80% which provides high detection efficiencies. In exemplary arrangements the concentration of Gd as Gd-DTPA in gel may range from about 7.3 wt% to 11 wt%. As can be appreciated, this is far above the 0.1 wt% threshold at which high detection efficiency is achieved.

Concentrations of the various FLP's can be varied to correspondingly vary the strength of the fluorescent signal. For example, in some embodiments an increase in Q-dot concentration provides a stronger fluorescent signal. Thus, in some embodiments higher concentrations of water soluble FLP's may be used to increase detection efficiency and decrease size of the radiation detector.

Deionized nano pure water can be used to prepare all aqueous solutions for gel preparation. In alternative embodiments the scint-gel can include alternative compositions of FLP's. For example, Q-dots can be used that are based on carbon (C-dots), which have the capacity for higher levels of fluorescence and are non-toxic. A gel composition (which includes Gd-DTPA) may comprise other compounds, such as Acrylamide: N,N-Methylenebisacrylamide; Ammonium persulfate; and/or TEMED (N,N,N',N'-Tetramethylethylenediamine).

An exemplary gel composition usable in connection with detectors of the type described herein is as follows:

| Compound | Amount for total vol. of 78 mL for gel |
| --- | --- |
| Acrylamide:N,N-Methylene-bisacrylamide (29:1%) | 38 mL (40% $H_2O$ by wt.) |
| Ammonium persulfate | 2 mL (10% conc.) |
| TEMED (N,N,N',N'-Tetramethyl-ethylenediamine), | 0.5 mL |
| CdSe/ZnS core-shell in a water soluble carboxylic acid (COOH) solution | 0.08 mM |
| Gd-DTPA | 38 mL of stock sol.(in $H_2O$): 40 mg/mL Gd-DTPA (7.3 wt % Gd) |

The exemplary gel composition contains concentrations of Gd for a greater than 90% detection efficiency as well as concentration of the FLP which produce a strong fluorescence emission signal within the gel. The gel is approximately 55% water, in a rigid gel composition, which can be poured into a mold in any shape desired for a favorable orientation of a detection array or to accommodate size or shape restrictions for the type of system (i.e. portal monitors for neutron detection of vehicles versus cargo containers, or to fit limited space areas on reactor floors for antineutrino detectors). Since in this exemplary composition the gel components are homogeneously distributed within the gel, the gel material may be molded and cut to provide pieces of suitable shapes and sizes for the particular environment in which the detection function is carried out.

The specific applications of the exemplary scintillator gels are numerous because of their usability in providing detection of nuclear reactions and/or nuclear materials. For example, the exemplary scintillator gel can be used in detectors (e.g., a neutron detector, an antineutrino detector, etc.) that detect radiation particles. The detection of radiation particles is a key component in many applications, including national and homeland security, industry, medical, and science. As can be appreciated, the novel chemical approach to radiation detection provided by the exemplary Gd-ScintGel can help prevent nuclear or radiological terrorism.

The exemplary scintillator gels can be used in arrangements that provide remote indications of the presence of radioactive material (e.g., nuclear reactor or weapons radioactive material), and further provide a degree of discrimination on the type and quantity of radioactive material present. Embodiments allow for radiation detection systems to employ the exemplary Gd-loaded/FLP scint-gel to detect smuggled nuclear and radiological material.

The exemplary radiation detection equipment can also be used in the monitoring of (already) known special nuclear material to ensure its security. For example, the use of the exemplary scintillators in radiation detectors can ensure that stores of special nuclear material are fully accounted for. Accurate counting of radiation particles (e.g., neutrons) over long time periods is one way to monitor the continued presence of radioactive materials (such as plutonium).

The exemplary embodiments allow for the deployment of thousands of radiation portal monitors, both domestically and overseas. As a result, the exemplary embodiments can contribute to enabling the United States and specific agencies, such as the International Atomic Energy Agency (IAEA), to meet their nuclear security and monitoring needs.

Some specific applications for applying the exemplary radiation detection apparatus and methods include monitoring of vehicles and cargo containers at ports and border crossings (domestic and international) for the presence of radioactive material. The exemplary Gd-loaded/FLP scint-gel allows for most radioactive materials to be easily detected. Similar monitoring of vehicles and cargo containers can also be conducted at military facilities and other locations. A further application of the Gd-loaded/FLP scint-gel includes detection of nuclear detonation, with remote confirmation of the nuclear nature of the event.

Figure 4:
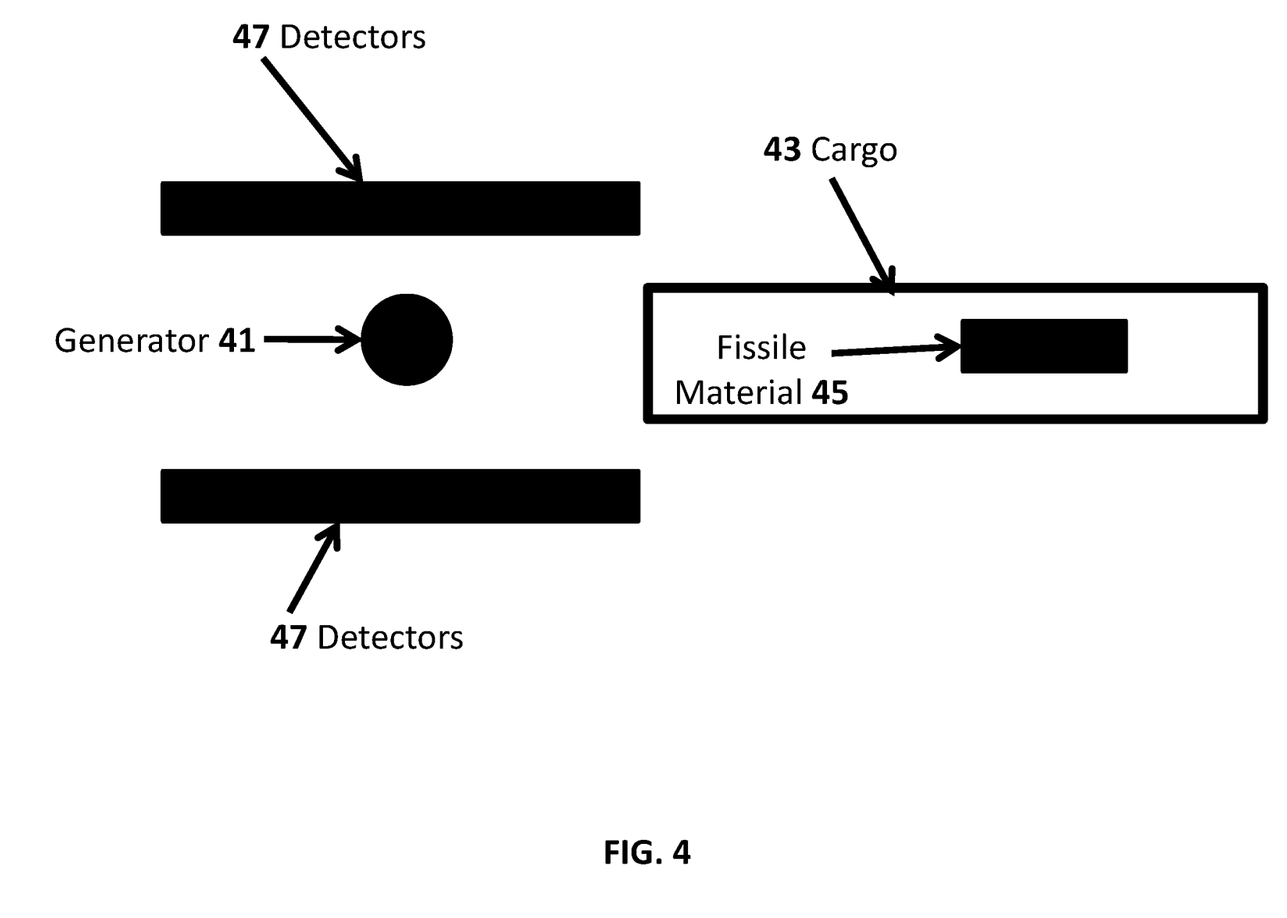
FIG. 4 illustrates a detector system comprising an exemplary scint-gel, such as Gd-loaded/FLP scint-gel.

FIG. 4 shows a detection system that includes exemplary detectors comprising a Gd-loaded/FLP scint-gel. The system preferably includes a below ground neutron generator 41. The generator 41 is operable to bathe containerized cargo 43 with neutrons. Interaction of the neutrons with fissile material 45 inside the cargo 43 will produce a nuclear fission reaction, which produces a positron and a neutron. The fission reaction is followed by the neutron interacting with the Gd. The interaction is followed by a shower of ~8 MeV gamma rays from the Gd. The gamma rays result in scintillation of the FLP. The process results in detection of radioactive material in fractions of a second. The scan/search can be conducted as the container continues to move (non-stop) through (or relative to) the detection system.

As can be seen, FIG. 4 includes an array of detectors 47. The array of detectors 47 include associated detector circuitry (not shown in FIG. 4 for simplicity). The detector circuitry is configured to feed into at least one processor (not shown in FIG. 4 for simplicity). The processor includes programming that is configured to analyze received signal data. Thus, the processor is operable to provide output indicative of respective results of container scanning, including whether radioactive (or questionable) material has been detected.

Also, because the novel scint-gel can be fashioned in essentially any orientation, it allows for more detector sections in a scanning system. The additional sections allow for throughput of cargo at increasing speeds. For example, by scanning in a cascade fashion down the line, it will be possible to retain speed and efficiency by (simultaneously) testing sections of cargo containers on a conveyer belt style system with a pulsed neutron source generator.

In another application, the oil and gas industries can use radiation detectors with respect to well logging. For example, the use of neutron sources and neutron detectors in well logging can indicate properties such as rock porosity and the presence of hydrocarbons.

Current and future antineutrino detectors will benefit from the new scint-gel, especially as a replacement for standard scintillators or water. The exemplary Gd-loaded/FLP scint-gel allows for a number of different detection deployment options for the antineutrino detectors, including those distinguished by range and by over burden. Exemplary scint-gel equipped antineutrino detector arrangements allow for measurements that can be made at distance scales of interest. These range scales can include: (1) near-field: 10 meters to 1 kilometer from a nuclear power or research reactor; (2) mid-field: 1-10 kilometers from a nuclear reactor; and (3) far-field: 10 kilometers and beyond from a nuclear explosion or a nuclear reactor.

As can be appreciated, the scint-gel equipped antineutrino detectors allow for monitoring and discovery (or exclusion) of small, low megawatt, thermal reactors at standoff distances up to 10 kilometers. Discovery and exclusion are also capable at longer ranges, as is remote nuclear explosion detection at the kiloton level.

Some representative uses of the exemplary scint-gel equipped antineutrino detectors include aboveground and below ground detection operations, for example the detection of boat, airplanes, trucks, submarines and other vehicles containing a nuclear explosion device. For example, an aboveground operation for antineutrino detection with regard to mobile vehicles may involve a 50 ton detector for a detection range of approximately 100 meters.

As can be appreciated, the implementation of detectors using the exemplary Gd-loaded/FLP scint-gel also allows for the deployment of smaller, more robust compact detectors. These compact detectors can be both portable for rapid response activities and stationary for long term use in radiation monitoring environments.

The exemplary embodiment provides for Gd-loaded scint-gel detection systems for neutrons and antineutrinos. The Gd offers a component with a large neutron capture cross section, thereby reducing neutron capture times.

Figure 5:
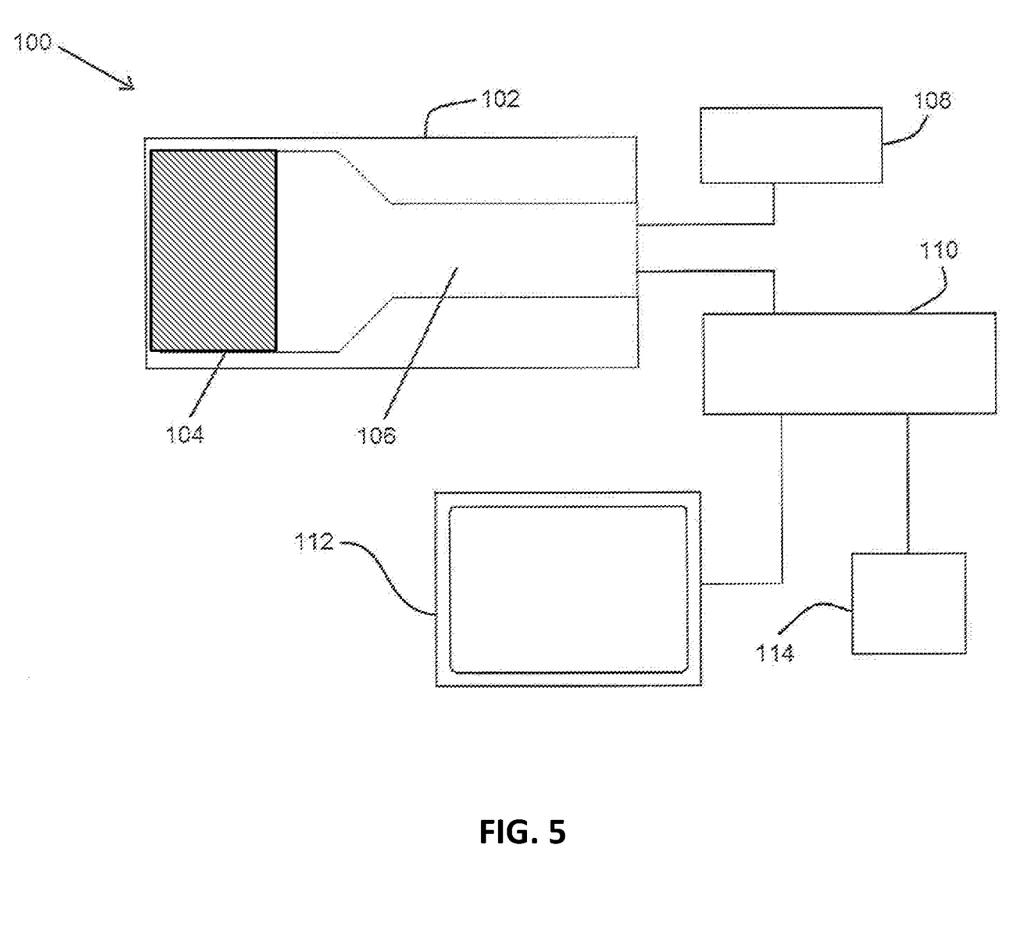
FIG. 5 schematically illustrates a detector arrangement that includes the exemplary scint-gel.

FIG. 5 shows a (compact) detector structure 100 for a detection system. FIG. 5 further shows an enclosure 102, an exemplary Gd-loaded/FLP scint-gel 104, photomultiplier tube (PMT) 106, voltage supply 108, circuitry 110, a readout device 112 (e.g., a display), and a data store 114. The circuitry 110 includes at least one processor. The processor is associated with computer programming comprising computer executable instructions in the data store that can identify and analyze the actuation intensity of the FLP's. The circuitry 110 may also include (or be in operative connection with) other components, including any of a pulse discriminator, a digital counter, a multichannel analyzer, an amplifier, and/or a coincidence circuit. The circuitry allows a determination to be made on whether nuclear (radioactive) material has been detected (or is present). It should be understood that FIG. 5 is a schematic representation and that not all detector components are necessarily shown in FIG. 5.

Figure 6:
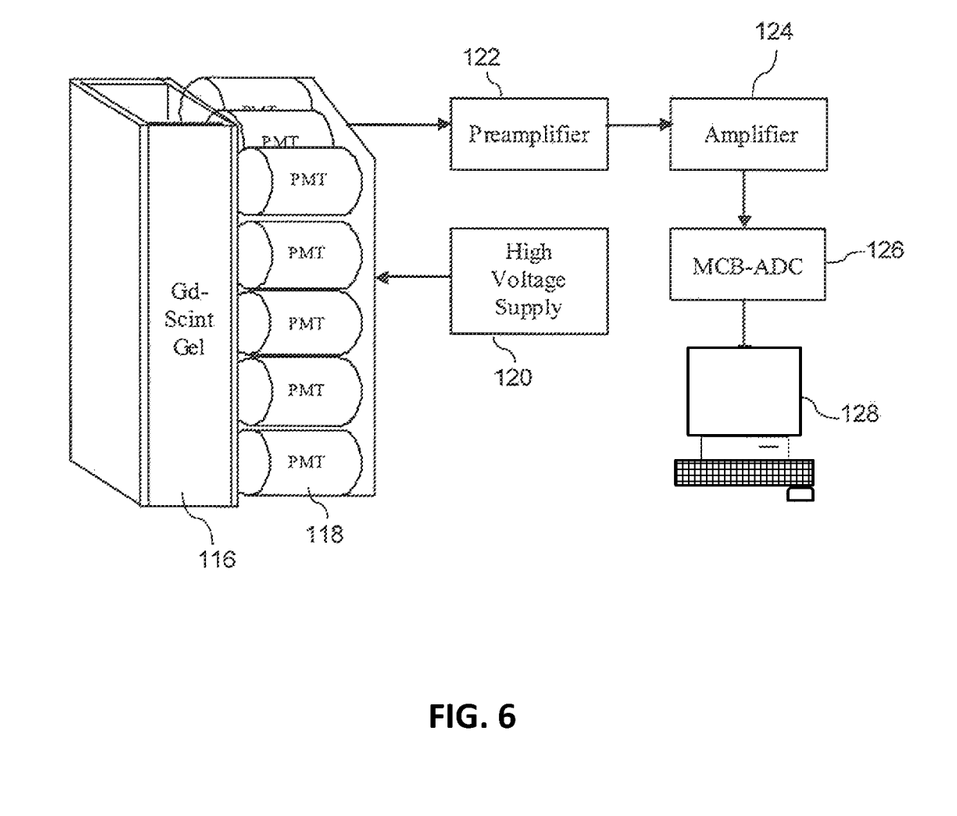
FIG. 6 is a schematic of an alternative exemplary detector arrangement.

An alternative detector structure is shown schematically in FIG. 6. FIG. 6 discloses a Gd-loaded/FLP scint-gel body 116 which may be one of the types previously described. The scint-gel body 116 is in proximity to an array of photomultiplier tubes 118. In the exemplary arrangement the photomultiplier tubes used in the array may be Philips Model XP2202B 10 stage PMTs. The photomultiplier tubes are supplied with high voltage power from a power supply 120. In the exemplary arrangement the power supply is operative to supply the photomultiplier tubes with approximately 1200 volts. This is accomplished in an exemplary arrangement using a Ortec 556 high voltage power supply. Of course it should be understood that in other embodiments other arrangements may be used.

In the exemplary embodiment the photomultiplier tubes are each in operative connection with a base unit that incorporates a preamplifier 122. In the exemplary arrangement the preamplifier is a Camberra Model 2007P. In the exemplary arrangement the preamplifier integrates the charge impulse from the anode of the PMT. Signals from preamplifier 122 are delivered to an amplifier 124. The amplifier 124 is a suitable amplifier which is capable of a 2 µs shaping time. In the exemplary arrangement, an Ortec Model 572A amplifier is used for this purpose. The signals from the amplifiers 124 are converted to digitized signals using a multichannel buffer (MCB) and analog to digital converter (ADC) generally indicated 126. In the exemplary arrangement an Ortec 926 multichannel buffer with 8192 channels and analog to digital converter are used.

The digital output signals are delivered to a suitable computing device schematically indicated 128. Computer 128 comprises circuitry including at least one processor and at least one data store. The computer operates to save the digitized outputs corresponding to the outputs from the photomultiplier tubes. The digitized outputs are captured in the data store of the computer 128 and analyzed using computer programs such as Maestro-32 multi-channel analyzer and GammaVision 7 gamma spectroscopy application software from Ortec. In the exemplary arrangement electronic noise is reduced through signal filtering and conditioning which is accomplished electronically in the software including by setting the lower level discriminator (LLD). Pulses that occur below the set level of the LLD are not registered. This avoids the need to analyze extraneous signals which do not correspond to the reactions of interest.

The exemplary arrangement shown in FIG. 6 is configured as a stand system setup that can be modified for use in connection with specific applications related to neutron or anti-nutrino detection. The attenuation length of the exemplary target scintillator is above 5 m in the wave length region from 450 nm to 550 nm. This is the region where the main scintillator emission occurs and also where the inner detector photomultiplier tubes are sensitive. Of course it should be understood that this arrangement is exemplary and that such systems may be expanded for large area detection, or simplified using a lesser number of photomultiplier tubes and a smaller gel body for more compact systems. Other detector apparatus may include the exemplary Gd-loaded/FLP scint-gel compounds and may include other detector components and arrangements.

As can be appreciated, the exemplary gel scintillator allows for antineutrino detectors, which are used in nuclear reactor monitoring and safeguards, to be reduced in physical size. The exemplary scintillator also allows for the stability of current commercial neutron and antineutrino detectors to be enhanced. The exemplary scintillator further allows for unattended application of such detectors. Thus, the exemplary embodiment allows for continuous, non-intrusive, unattended detector measurements in reactor treaty verification, including unattended IAEA reactor safeguards measurements.

As previously discussed, in some embodiments the principles involved in both neutron and antineutrino detection may be the same. However, the chemical makeup and concentrations of compounds targeted for each respective (neutron or antineutrino) gel detection system can be unique to that system. Furthermore, the inventive scope of the disclosure herein also allows for a single scint-gel detector system that can be used to provide acceptable detection levels for both neutrons and antineutrinos.

Although the exemplary arrangements have been described based upon preferred embodiments, certain modifications, variations, and alternative constructions are also within the spirit and scope of the principles described herein. Example arrangements and compositions of scint-gel for radiation detection have been described herein with reference to particular components, features, properties, attributes, relationships, and methods. However, it should be understood that in other embodiments other arrangements and compositions may include other materials, features, properties, attributes, and/or relationships which provide similar capabilities functionality, and structure.

It will be readily understood that the features of exemplary embodiments, including those generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, including those represented in the Figures, is not intended to limit the scope of the invention as claimed, but is merely representative of selected exemplary embodiments that implement the principles described herein. Moreover, the descriptions and illustrations herein are by way of examples and the inventive teachings are not limited to the specific details shown and described.

The novel structure, along with the methods of preparing and using the novel structure, achieves at least one of the above stated objectives, eliminates difficulties encountered in the use of prior devices and systems, solves problems, and attains the desirable results described herein.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

We claim:

1. A scintillator gel comprising:
a fluorophor;
a water soluble gadolinium (Gd) compound;
wherein the fluorophor and the water soluble gadolinium (Gd) compound are dispersed homogenously throughout a water-based gel, the water soluble gadolinium (Gd) compound is either gadolinium-diethylene triaminepentaaceticacid (Gd-DTPA) or gadolinium beta-diketones.

2. The apparatus scintillator gel according to claim 1 wherein the scintillator gel is part of a neutron detector, wherein the neutron detector includes at least one photo multiplier tube.

3. The apparatus scintillator gel according to claim 1 wherein the scintillator gel is part of an antineutrino detector, wherein the antineutrino detector includes a at least one photo multiplier tube.

4. The apparatus scintillator gel according to claim 1 wherein the fluorophor is selected from a group consisting of CdSe/ZnS quantum dots dot nanoparticles, coumarin derivatives (7-hydroxy-4-methylcoumarin, 7-hydroxy-4-methylcoumarin-3-acetic acid, 7-hydrocycoumarin-3-carboxylic acid, and Alexa Fluor 350), and carbostyril 124, or a combination thereof.

5. The apparatus scintillator gel according to claim 4 wherein the fluorophor comprises CdSe/ZnS quantum dots dot nanoparticles in a carboxylic acid solution.

6. The scintillator gel according to claim 4 wherein the water-based gel comprises at least one of agarose, polyacrylamide and or a methylcellulose polymer.

7. The scintillator gel according to claim 1 wherein the water-based gel comprises a density of approximately 1.25g/cm$^3$.

8. The scintillator gel according to claim 1 wherein the water-based gel includes a gadolinium concentration above 0.1 wt %.

9. The scintillator gel according to claim 8 wherein the water-based gel includes a gadolinium concentration above 7.3 wt %.

10. The scintillator gel according to claim 1 wherein the water-based gel is generally optically transparent.

11. The scintillator gel according to claim 1 wherein the water-based gel includes a moderator, wherein the moderator comprises at least one of deuterium and or a water based water-based clear polymer.

12. The scintillator gel according to claim 1 wherein the water-based gel is derived from a silica-based aerogel.

13. A radiation detector comprising:
a scintillator gel, the scintillator gel formed of a water soluble gadolinium (Gd) compound and a fluorophor in a stable water-based gel, wherein the Gd is dispersed homogenously throughout the water-based gel, the water soluble gadolinium (Gd) compound being either gadolinium-diethylene triaminepentaaceticacid (Gd-DTPA) or gadolinium beta-diketones;
the scintillator gel disposed in a scint-gel body, at least one photo multiplier tube in communication with the scint-gel body, a processor in communication with the photo multiplier tube, the processor having an output, the output of the processor corresponding to a radiation level.

14. The radiation detector of claim 13 wherein the radiation detector further includes a plurality of photo multiplier tubes including said at least one photo multiplier tube.

15. The radiation detector of claim 13 wherein the detector is a neutron detector.

16. The radiation detector of claim 13 wherein the detector is an antineutrino detector.

17. The radiation detector of claim 13 wherein the radiation detector is disposed in proximity to a neutron generator, the neutron generator bathing a cargo container with neutrons, a fissile material contained within the cargo container emitting at least one proton and at least one neutron.

18. The radiation detector of claim 13 wherein the radiation detector detects antineutrinos at least ten kilometers from a nuclear explosion or a nuclear reactor.

* * * * *